US010388966B2

(12) United States Patent
Kondou et al.

(10) Patent No.: US 10,388,966 B2
(45) Date of Patent: Aug. 20, 2019

(54) ELECTRODE CATALYST MATERIAL, AND FUEL CELL

(71) Applicant: Panasonic Intellectual Property Management Co., Ltd., Osaka (JP)

(72) Inventors: Keiichi Kondou, Hyogo (JP); Kazuya Yamasaki, Osaka (JP); Hitoshi Ishimoto, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/823,571

(22) Filed: Nov. 28, 2017

(65) Prior Publication Data
US 2018/0083291 A1    Mar. 22, 2018

Related U.S. Application Data

(63) Continuation of application No. PCT/JP2016/002642, filed on Jun. 1, 2016.

(30) Foreign Application Priority Data

Jun. 18, 2015  (JP) .................. 2015-122852
Sep. 30, 2015  (JP) .................. 2015-192384

(51) Int. Cl.
| | | |
|---|---|---|
| H01M 4/90 | (2006.01) | |
| B01J 23/42 | (2006.01) | |
| B01J 35/08 | (2006.01) | |
| H01M 8/1004 | (2016.01) | |
| H01M 4/92 | (2006.01) | |
| H01M 8/083 | (2016.01) | |
| H01M 8/1018 | (2016.01) | |

(52) U.S. Cl.
CPC ........... *H01M 4/9058* (2013.01); *B01J 23/42* (2013.01); *B01J 35/08* (2013.01); *H01M 4/9083* (2013.01); *H01M 4/926* (2013.01); *H01M 8/1004* (2013.01); *H01M 8/083* (2013.01); *H01M 2008/1095* (2013.01)

(58) Field of Classification Search
CPC .. H01M 4/9058; H01M 4/926; H01M 8/1004; H01M 4/9083; H01M 2008/1095; H01M 8/083; B01J 35/08; B01J 23/42
USPC ........................................................ 429/483
See application file for complete search history.

(56) References Cited

U.S. PATENT DOCUMENTS

| | | | |
|---|---|---|---|
| 2006/0002844 A1* | 1/2006 | Suenaga | ................ B82Y 30/00 |
| | | | 423/447.3 |
| 2007/0207081 A1 | 9/2007 | Takikawa et al. | |
| 2015/0050583 A1 | 2/2015 | Schüth et al. | |

FOREIGN PATENT DOCUMENTS

| | | |
|---|---|---|
| JP | 2005-216772 | 8/2005 |
| JP | 2005-281065 | 10/2005 |

(Continued)

OTHER PUBLICATIONS

International Search Report of PCT application No. PCT/JP2016/002642 dated Aug. 23, 2016.

*Primary Examiner* — Gary D Harris
(74) *Attorney, Agent, or Firm* — McDermott, Will & Emery LLP (57) ABSTRACT

An electrode catalyst material includes graphite particles and catalyst particles. Each of the graphite particles has a hollow structure that includes an outer shell, and the outer shell has at least one of a through-hole and a recess. Each of the catalyst particles is supported by the at least one of through-hole and recess.

13 Claims, 5 Drawing Sheets

(56) References Cited

FOREIGN PATENT DOCUMENTS

| | | |
|---|---|---|
| JP | 2007-035281 | 2/2007 |
| JP | 2009-059524 | 3/2009 |
| JP | 2013-094705 | 5/2013 |
| JP | 2015-513449 | 5/2015 |

* cited by examiner

ELECTRODE CATALYST MATERIAL, AND FUEL CELL

RELATED APPLICATIONS

This application is a Continuation of International Application No. PCT/JP2016/002642, filed on, Jun. 1, 2016, which in turn claims the benefit of Japanese Application No. 2015-122852, filed on Jun. 18, 2015 and Japanese Application No. 2015-192384, filed on Sep. 30, 2015, the disclosures of which Applications are incorporated by reference herein.

BACKGROUND

1. Technical Field

The present disclosure relates to an electrode catalyst material and to a fuel cell.

2. Description of the Related Art

A fuel cell is a device that generates electric energy from hydrogen and oxygen, and can achieve a high power generation efficiency. A fuel cell has main characteristics as follows. Since a fuel cell directly generates power from chemical energy without undergoing thermal or kinetic energy states that are involved in a conventional power generation method, high power generation efficiency with a small size can be expected. Further, because of low emission of a nitrogen compound or the like, small noise and small vibration, a fuel cell has good properties in environmental aspect. As described above, a fuel cell achieves effective use of the chemical energy of fuel and has environmentally friendly characteristics, and thus is expected as an energy supplying system for the twenty-first century. For this reason, a fuel cell has been attracting attention as a promising power generation system that can be used for various applications such as uses in space, an automobile, and a mobile instrument, and uses ranging from large-scale power generation to small-scale power generation. Accordingly, the technological development of the fuel cell has been fully in progress.

Japanese Unexamined Patent Publication No. 2009-059524 discloses a fuel cell composed of an electrolyte membrane, a pair of catalyst layers stacked on both surfaces of the electrolyte membrane and a pair of gas diffusion layers. A portion including the catalyst layer and the gas diffusion layer constitutes an electrode. Each of the catalyst layers included in the fuel cell includes a catalyst of platinum or the like and a catalyst carrier of carbon particles or the like as an electrode catalyst material.

In order to operate a fuel cell in a high current density region, it is necessary not only to enhance a catalyst activity but also to uniformly supply a fuel gas such as hydrogen and an oxidant gas such as air to the catalyst layer. The reason for this is that when diffusion rates of these gases are limited, power generation performance is significantly deteriorated. Since aggregates of carbon particles are present in the catalyst layer, the gases pass through voids between carbon particles as a gas diffusion path, and are supplied to the entire catalyst layer.

SUMMARY

An electrode catalyst material according to a first aspect of the present disclosure includes graphite particles and catalyst particles. Each of the graphite particles has a hollow structure that includes an outer shell, and the outer shell has at least one of a through-hole and a recess. Each of the catalyst particles is supported by the at least one of through-hole and recess. A part of the at least one of through-hole and recess is constituted by an edge of graphite constituting the each of the graphite particles.

An electrode catalyst material according to a second aspect of the present disclosure includes primary particles made of a carbon member and catalyst particles. Each of the primary particles made of the carbon member has a hollow structure that includes an outer shell, and the outer shell has through-holes. Each of the catalyst particles is supported on a surface of the outer shell. At least two of the through-holes are opened without being blocked by at least one of the catalyst particles.

A fuel cell according to a third aspect of the present disclosure includes an electrolyte membrane, an anode catalyst layer disposed on one surface of the electrolyte membrane, and a cathode catalyst layer disposed on a surface of the electrolyte membrane opposite to the above one surface of the electrolyte membrane. At least one of the anode catalyst layer and the cathode catalyst layer includes the electrode catalyst material of the first aspect or the second aspect.

According to the present disclosure, it is possible to improve power generation performance of a fuel cell.

DETAILED DESCRIPTION OF EMBODIMENT

Before describing exemplary embodiments of the present disclosure, a problem in a conventional configuration will be briefly described. The inventors of the present application have made earnest investigations concerning electrode catalyst materials to be used for the above-mentioned catalyst layer, and consequently recognized that conventional electrode catalyst materials can be improved in order to increase power generation performance of a fuel cell.

In the catalyst layer structure disclosed in Japanese Unexamined Patent Publication No. 2009-059524, a gas is adequately supplied to an interface between the gas diffusion layer and the catalyst layer, but the gas cannot be adequately supplied to an interface between the catalyst layer and the electrolyte membrane. Therefore, the structure causes an adverse effect that a distribution of a gas concentration becomes non-uniform and thus a power generation locally occurs within the catalyst layer. In order to allow the power generation to uniformly occur within the catalyst layer, it is necessary to spread a gas sufficiently within the catalyst layer. However, in the catalyst layer structure disclosed in Japanese Unexamined Patent Publication No. 2009-059524, since a number of the gas diffusion path is small, it is difficult to adequately supply a gas to the entire catalyst layer.

The present disclosure has been made in view of the above situation, and provides a technique for improving power generation performance of a fuel cell.

Hereinafter, exemplary embodiments of the present disclosure will now be described with reference to the accompanying drawings. In all drawings, any identical components are denoted by an identical reference sign, and any duplicate description thereof will be omitted as appropriate. The exemplary embodiments are not intended to limit the disclosure but are merely exemplary, and all characteristics and any combination thereof described in the exemplary embodiments do not necessarily represent essential elements of the disclosure.

First Exemplary Embodiment

Before specifically describing the present exemplary embodiment, an overview of the present exemplary embodiment will be described. The present exemplary embodiment relates to an electrode catalyst material. The electrode catalyst material includes a catalyst carrier and catalyst particles supported on the catalyst carrier. Carbon particles of acetylene black or Ketjen Black have been used as a catalyst carrier in conventional electrode catalyst materials. The inventors of the present application have made earnest investigations concerning electrode catalyst materials, and consequently found that conventional electrode catalyst materials can be improved in order to increase power generation performance of a fuel cell.

That is, in the conventional catalyst carrier, catalyst particles supported on the catalyst carrier may be gradually getting to aggregate along with the use of a fuel cell. Alternatively, catalyst particles in a state of aggregating may be supported on a catalyst carrier in a manufacturing process of an electrode catalyst material. When catalyst particles are aggregated, catalyst particles that contribute to an electrode reaction are reduced, and thus power generation performance of a fuel cell is lowered. In order to avoid such aggregation of the catalyst particles, the electrode catalyst material according to the present exemplary embodiment includes specific graphite particles. Hereinafter, the electrode catalyst material according to the present exemplary embodiment, and a fuel cell including the electrode catalyst material will be described in detail.

Figure 1:
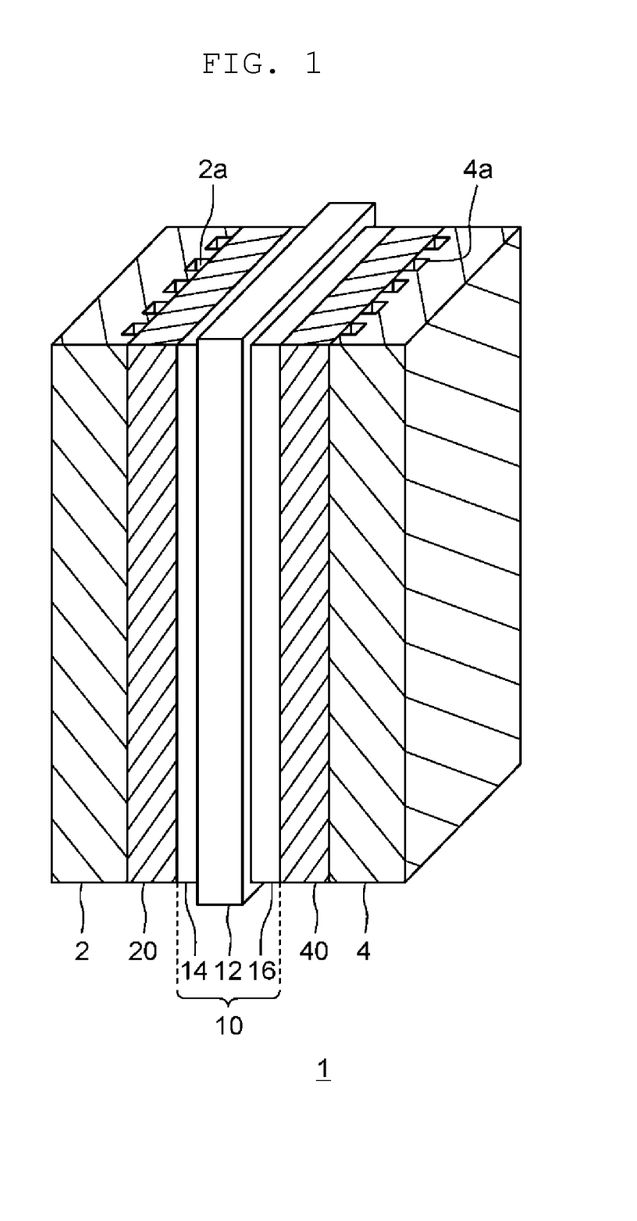
FIG. 1 is a schematic perspective view illustrating a structure of a fuel cell according to a first exemplary embodiment.

FIG. 1 is a schematic perspective view illustrating a structure of a fuel cell according to a first exemplary embodiment. Fuel cell 1 of the present exemplary embodiment includes substantially flat plate-like membrane electrode assembly 10, anode gas diffusion layer 20, and cathode gas diffusion layer 40. Anode gas diffusion layer 20 and cathode gas diffusion layer 40 are provided such that a main surface of anode gas diffusion layer 20 and a main surface of cathode gas diffusion layer 40 oppose each other with membrane electrode assembly 10 interposed between anode gas diffusion layer 20 and cathode gas diffusion layer 40. Further, separator 2 is provided on a surface of anode gas diffusion layer 20 opposite to membrane electrode assembly 10, and separator 4 is provided on a surface of cathode gas diffusion layer 40 opposite to membrane electrode assembly 10. In the present exemplary embodiment, a set of membrane electrode assembly 10, anode gas diffusion layer 20, and cathode gas diffusion layer 40 are described. However, a fuel cell stack may be constituted by stacking a plurality of sets of membrane electrode assembly 10, anode gas diffusion layer 20, and cathode gas diffusion layer 40 with separators 2, 4 interposed between the sets. Fuel cell 1 of the present exemplary embodiment is a polymer electrolyte fuel cell (PEFC).

Membrane electrode assembly 10 is constituted by electrolyte membrane 12, anode catalyst layer 14, and cathode catalyst layer 16. Anode catalyst layer 14 is disposed facing to one main surface of electrolyte membrane 12. Cathode catalyst layer 16 is disposed facing to the other main surface opposite to the one main surface of electrolyte membrane 12. In the present exemplary embodiment, anode catalyst layer 14 and cathode catalyst layer 16 are arranged on both sides of electrolyte membrane 12.

Electrolyte membrane 12 exhibits good ionic conductivity in a wet state, and serves as an ion-exchange membrane that allows protons to move between anode catalyst layer 14 and cathode catalyst layer 16. Electrolyte membrane 12 is formed of a solid polymer material such as a fluorine-containing polymer or a non-fluorine polymer. As the material of electrolyte membrane 12, a sulfonic acid type perfluorocarbon polymer, a polysulfone resin, a perfluorocarbon polymer including a phosphonate group or a carboxylic acid group, or the like can be used. Examples of the sulfonic acid type perfluorocarbon polymer include Nafion (manufactured by Du Pont; registered trademark) 112 and the like. Examples of the non-fluorine polymer include sulfonated aromatic polyether ether ketone, polysulfone, and the like. A thickness of electrolyte membrane 12 ranges, for example, from 5 μm to 50 μm, inclusive.

Anode catalyst layer 14 and cathode catalyst layer 16 include the electrode catalyst material according to the present exemplary embodiment. The configuration of the electrode catalyst material will be described later in detail. A thickness of each of anode catalyst layer 14 and cathode catalyst layer 16 ranges, for example, from 1 μm to 100 μm, inclusive.

Anode gas diffusion layer 20 is stacked on a main surface, which is provided with anode catalyst layer 14, of membrane electrode assembly 10. Cathode gas diffusion layer 40 is stacked on a main surface, which is provided with cathode catalyst layer 16, of membrane electrode assembly 10. Anode gas diffusion layer 20 and cathode gas diffusion layer 40 may be a porous body having electron conductivity, and a publicly known material can be used as a material for the porous body. For anode gas diffusion layer 20 and cathode gas diffusion layer 40, for example, a metal plate, a metal film, a conductive polymer, carbon paper, a carbon fabric cloth, a carbon nonwoven fabric or the like can be used.

Anode gas diffusion layer 20 and cathode gas diffusion layer 40 may be composed of a mixed material of at least one of conductive particles and conductive fibers, and a thermoplastic resin. As the conductive particles, for example, carbon particles of carbon black, artificial graphite, natural graphite, or expanded graphite, or metal particles can be used. As the conductive fibers, for example, carbon fibers such as polyacrylonitrile carbon fibers, rayon carbon fibers, pitch carbon fibers or carbon nanotubes, or metal fibers can be used. As the thermoplastic resin, fluorine resin such as polytetrafluoroethylene (PTFE), tetrafluoroethylene-perfluoroalkyl vinyl ether copolymer (PFA), tetrafluoroethylene-hexafluoropropylene copolymer (FEP) or tetrafluoroethylene-ethylene copolymer (ETFE) can be used. A thickness of each of anode gas diffusion layer 20 and cathode gas diffusion layer 40 ranges, for example, from 150 μm to 550 μm, inclusive.

Separator 2 is stacked on a main surface of anode gas diffusion layer 20. Gas passages 2a are provided on a main surface of separator 2 that faces to anode gas diffusion layer 20. A fuel gas such as hydrogen gas is distributed to gas passages 2a through a fuel supply manifold (not illustrated), and is supplied to anode gas diffusion layer 20 through gas passages 2a. Then, the fuel gas is supplied from anode gas diffusion layer 20 to anode catalyst layer 14. Cooling water passages (not illustrated) are provided on a main surface of separator 2 opposite to the main surface, which is provided with gas passages 2a.

Separator 4 is stacked on a main surface of cathode gas diffusion layer 40. Gas passages 4a are provided on a main surface of separator 4 that faces to cathode gas diffusion layer 40. An oxidant gas such as air is distributed to gas passages 4a through an oxidant supply manifold (not illustrated), and is supplied to cathode gas diffusion layer 40 through gas passages 4a. Then, the oxidant gas is supplied from cathode gas diffusion layer 40 to cathode catalyst layer 16. Gas passages 4a each also serve as a drainage path for water generated in cathode catalyst layer 16. Cooling water passages (not illustrated) are provided on a main surface of separator 4 opposite to the main surface, which is provided with gas passages 4a.

Separators 2, 4 may have a sufficient conductive property and a sufficient corrosion resistance, and as a material of the separator, a publicly known material can be used. For example, a carbon flat plate, a plate of metal such as stainless steel, titanium, or the like can be used for separators 2, 4. A thickness of each of separators 2, 4 ranges, for example, from 50 μm to 300 μm, inclusive.

In some cases, a stacked structure of anode catalyst layer 14 and anode gas diffusion layer 20 is referred to as an anode, and a stacked structure of cathode catalyst layer 16 and cathode gas diffusion layer 40 is referred to as a cathode.

A reaction described below takes place in polymer electrolyte fuel cell 1 described above. That is, when hydrogen gas as a fuel gas is supplied to anode catalyst layer 14 through anode gas diffusion layer 20, a reaction represented by Formula (1) below takes place in anode catalyst layer 14, and hydrogen decomposes into a proton and an electron. The proton moves to cathode catalyst layer 16 in electrolyte membrane 12. The electron moves to an external circuit (not illustrated) through anode gas diffusion layer 20 and separator 2, and then flows from the external circuit into cathode catalyst layer 16 through separator 4 and cathode gas diffusion layer 40. On the other hand, when air as an oxidant gas is supplied to cathode catalyst layer 16 through cathode gas diffusion layer 40, a reaction represented by Formula (2) below takes place in cathode catalyst layer 16, and oxygen in the air becomes water through a reaction with protons and electrons. As a result, electrons flow from the anode toward the cathode through the external circuit, and thus electrical power can be generated.

Figure 2A:
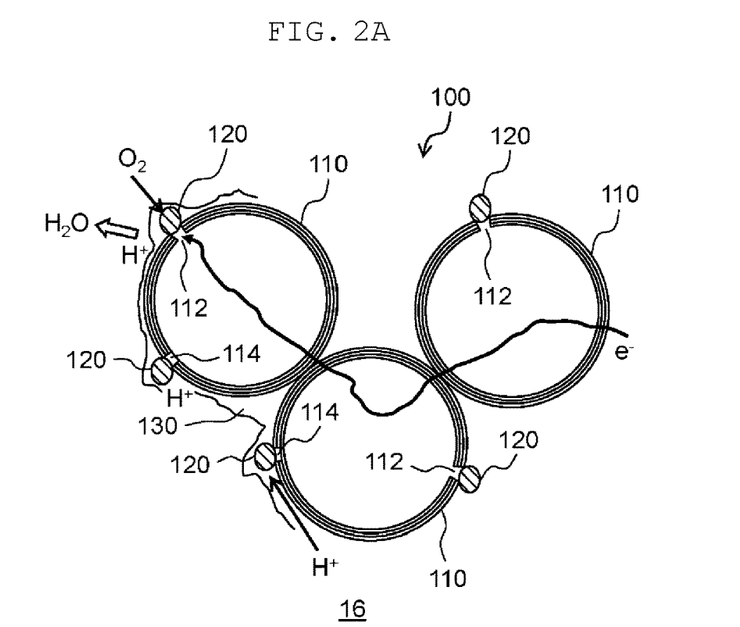
FIG. 2A is an enlarged schematic view illustrating a part of a cathode catalyst layer.
Figure 2B:
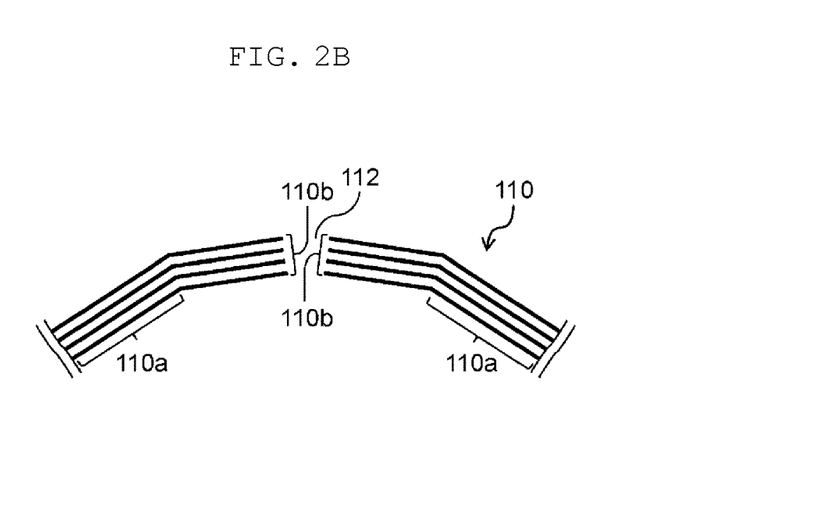
FIG. 2B is an enlarged schematic view illustrating a part of a graphite particle.
Figure 2C:
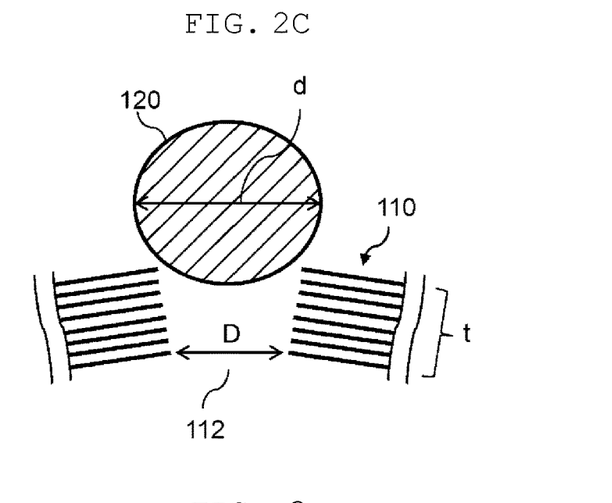
FIG. 2C is an enlarged schematic view near a through-hole of a graphite particle.

Subsequently, the electrode catalyst material contained in anode catalyst layer 14 and cathode catalyst layer 16 will be described in detail. Here, the electrode catalyst material contained in cathode catalyst layer 16 will be described as an example. The electrode catalyst material contained in anode catalyst layer 14 has the same constitution as that contained in cathode catalyst layer 16. FIG. 2A is an enlarged schematic view illustrating a part of cathode catalyst layer 16. FIG. 2B is an enlarged schematic view illustrating a part of graphite particle 110. Actually, an electron e⁻ predominantly moves along a surface of graphite particle 110, but an arrow indicating a moving path is drawn through a hollow portion of graphite particle 110 in FIG. 2A in order to facilitate viewing a state of move of the electron e⁻. FIG. 2C is an enlarged schematic view near a through-hole of a graphite particle.

Electrode catalyst material 100 includes graphite particles 110 and catalyst particles 120. In the present exemplary embodiment, electrode catalyst material 100 further includes ion exchange resin 130.

Each of graphite particles 110 serves as a catalyst carrier having a conductive property. Each of graphite particles 110 has a hollow structure that includes an outer shell, and the outer shell has through-holes 112 and recesses 114. Each of through-holes 112 penetrates from an outer surface to an inner surface of graphite particle 110. Each of recesses 114 is a closed-end hole which extends from the outer surface of graphite particle 110 to a midpoint in a graphite layer of graphite particle 110. As graphite particle 110, graphitized hollow carbon or the like can be used.

The outer shell forming an internal space of graphite particle 110 has a structure (graphite) in which a plurality of layers (graphene) composed of carbon six-membered rings lining up are stacked. The stacked structure of graphite particle 110 is maintained by a π-π interaction between the carbon six-membered rings of a neighboring layer (graphene). Further, as shown in FIG. 2B, flat basal surfaces 110a are connected to each other with bending parts interposed between basal surfaces 110a, so that graphite particle 110 has a substantially spherical shape. Each of edges 110b of graphite has an electron transfer activity higher than that of each of basal surfaces 110a. Thus, catalyst particle 120 serving as a positively-charged carrier is easily bound to each of edges 110b of graphite.

Each of through-hole 112 is constituted by edges 110b of graphite constituting graphite particle 110. Catalyst particle 120 is stably supported on graphite particle 110 at through-hole 112 by a high electron transfer activity of edge 110b and a fit to through-hole 112. Through-hole 112 has a minimum diameter of, for example, 1 nm to 20 nm, inclusive. The minimum diameter of through-hole 112 means an inner diameter of a portion where an inner diameter of through-hole 112 becomes smallest between an opening of through-hole 112 at the outer surface of graphite particle 110 and an opening of through-hole 112 at the inner surface of graphite particle 110. The minimum diameter of through-hole 112 is determined, for example, as described below. That is, graphite particle 110 is cut, and its cut section is observed with a transmission electron microscope (TEM). A width of through-hole 112 in a TEM image is defined as an inner diameter of through-hole 112. Since a plurality of through-holes 112 come out at the cut section, a dimension of a minimum width portion between the opening at the outer surface and the opening at the inner surface of each through-hole 112 is measured as a temporary minimum diameter D1. Then, the largest one of the temporary minimum diameters D1 of all through-holes 112 is considered as a minimum diameter D of through-holes 112. When a number of through-holes 112 coming out at the cut section is large, a number of measurements of the temporary minimum diameter D1 may be reduced, for example, in a manner that the temporary minimum diameter D1 of one through-hole 112 per ten through-holes 112 is measured. In addition, the temporary minimum diameter D1 of each through-hole 112 is often an inner diameter of through-hole 112 at the inner surface of graphite particle 110.

An inner side surface of each of recesses 114 is constituted by edge 110b of graphite constituting graphite particle 110. Catalyst particle 120 is stably supported on graphite particle 110 at recess 114 by a high electron transfer activity of edge 110b and a fit to recess 114. Recess 114 has a minimum diameter of, for example, 1 nm to 20 nm, inclusive. The minimum diameter of recess 114 means an inner diameter of a portion where an inner diameter of recess 114 becomes smallest between an opening of recess 114 and a bottom surface of recess 114 at the outer surface of graphite particle 110. The inner diameter and minimum diameter of recess 114 are determined in the same manner as in the inner diameters and minimum diameter of through-holes 112. Recess 114 has a maximum depth of, for example, 1 nm to 20 nm inclusive. The maximum depth of recess 114 means a maximum distance of distances from an opening of recess 114 to a bottom surface of recess 114 at the outer surface of graphite particle 110.

A total number of through-holes 112 and recesses 114 can be adjusted such that a proportion of a mass of catalyst particles 120 in a total mass of the electrode catalyst material is, for example, from 30% by mass to 70% by mass, inclusive. Further, through-holes 112 and recesses 114 are approximately uniformly (at equal intervals) arranged on the outer surface of graphite particle 110.

Each of catalyst particles 120 is, for example, a particle of platinum (Pt) which is a catalyst metal. An average particle diameter of catalyst particles 120 ranges, for example, from 1 nm to 20 nm, inclusive. The average particle diameter of catalyst particles 120 is determined, for example, in the following manner. That is, the average particle diameter of catalyst particles 120 is an arithmetic average particle diameter of circle equivalent diameters obtained from image binarization analysis of electron microscopic images.

As illustrated in FIG. 2C, the minimum diameter D of through-hole 112 is preferably smaller than an average particle diameter d of catalyst particles 120. This makes it possible to inhibit catalyst particle 120 from entering into an internal space of graphite particle 110 from through-hole 112. As a result, it is possible to inhibit reduction of a number of catalyst particles contributing to the electrode reaction. Furthermore, the minimum diameter D of through-hole 112 is preferably one-half of the average particle diameter (d/2) or more of catalyst particle 120. This makes it possible to more suitably hold catalyst particle 120 at through-hole 112. Therefore, the aggregation of catalyst particles 120 can be suppressed more securely.

A distance t from the opening of through-hole 112 at the outer surface of graphite particle 110 to a position where the inner diameter of through-hole 112 becomes smallest is preferably smaller than the average particle diameter d of catalyst particles 120. Graphite particle 110 has an outer shell thickness of 1 nm to 50 nm, inclusive, and more preferably 1 nm to 10 nm, inclusive. Here, when the minimum diameter D of through-hole 112 is determined from the inner diameter of through-hole 112 at the inner surface of graphite particle 110, the distance t from the opening of through-hole 112 at the outer surface of graphite particle 110 to the position where the inner diameter of through-hole 112 becomes smallest corresponds to the outer shell thickness of graphite particle 110. This makes it possible to protrude catalyst particle 120 from the surface of graphite particle 110, so that catalyst particle 120 can more securely contribute to the electrode reaction. As a result, it is also possible to improve power generation performance when a power generation amount is large.

Furthermore, the distance t from the opening of through-hole 112 at the outer surface of graphite particle 110 to the position where the inner diameter of through-hole 112 becomes smallest (the outer shell thickness of graphite particle 110 when the minimum diameter D of through-hole 112 is determined to be the inner diameter of through-hole 112 at the inner surface of graphite particles 110) is preferably 0.3 times or more and 0.7 times or less (t=0.3d to 0.7d) as large as the average particle diameter d of catalyst particles 120. This makes it possible to protrude catalyst particle 120 from the surface of graphite particle 110 while being stably supported on the surface of graphite particle 110, so that catalyst particle 120 can more securely contribute to the electrode reaction. As a result, it is also possible to further improve power generation performance when a power generation amount is large.

In addition, FIG. 2C shows, for illustrative purposes, through-hole 112 having the same inner diameter as the minimum diameter D at the inner surface of graphite particle 110, and catalyst particle 120 having the same particle diameter as the average particle diameter d, as an example.

Further, although not illustrated, as with through-hole 112, the minimum diameter D of recess 114 is preferably one half or more of the average particle diameter d of catalyst particles 120 and less than the average particle diameter d of catalyst particles 120. This makes it possible to more suitably hold catalyst particle 120 at recess 114. Therefore, the aggregation of catalyst particles 120 can be suppressed more securely. A maximum depth t of recess 114 is preferably smaller than the average particle diameter of catalyst particles 120. The maximum depth t of recess 114 is more preferably 0.3 times or more and 0.7 times or less (t=0.3d to 0.7d) as large as the average particle diameter d of catalyst particles 120. This makes it possible to protrude catalyst particle 120 from the surface of graphite particle 110, so that catalyst particle 120 can more securely contribute to the electrode reaction.

Ion exchange resin 130 (ionomer) plays a role of transferring a proton $H^+$ between catalyst particle 120 and electrolyte membrane 12. As ion exchange resin 130, a polymer material similar to electrolyte membrane 12 may be used.

As shown in FIG. 2A, in cathode catalyst layer 16, an electron ($e^-$) having transferred from cathode gas diffusion layer 40 moves, through graphite particle 110, to a reaction point at which catalyst particle 120 positions. Also, a proton ($H^+$) having transferred from electrolyte membrane 12 moves to the reaction point through ion exchange resin 130. Also, oxygen ($O_2$) supplied from cathode gas diffusion layer 40 to cathode catalyst layer 16 moves to the reaction point. Then, the reaction represented by Formula (2) above takes place at the reaction point by an action of catalyst particle 120 to generate water ($H_2O$).

Herein, each of edges 110b of graphite constituting graphite particle 110 may be configured to be terminated by fluorine. That is, fluorine exists in each of edges 110b of graphite. Accordingly, fluorine is bound with inner side surfaces of through-hole 112 and recess 114, and therefore water repellency is improved, and water ($H_2O$) generated by a reaction on catalyst particle 120 is discharged without staying near through-hole 112 or recess 114. Therefore, the oxidant gas such as oxygen can reach the reaction point of catalyst particle 120 without being blocked by water. As a result, it is also possible to improve power generation performance when a power generation amount is large.

Electrode catalyst material 100 can be manufactured by, for example, the following method. That is, first, two kinds of raw material are mixed in a predetermined ratio to obtain a raw material for graphitized hollow carbon. One is a raw material capable of producing relatively many carbon five-membered rings after a baking treatment described later. The other is a raw material hardly producing carbon five-membered rings after the baking treatment described later, for example, a raw material capable of producing a carbon six-membered ring. As the raw material capable of producing relatively many carbon five-membered rings, for example, polyacrylonitrile (PAN)-based raw materials subjected to an insoluble treatment, petroleum-based pitches, coal-based pitches, mesophase-based pitches or the like can be used. As the raw material capable of producing a carbon six-membered ring, for example, polycyclic aromatic hydrocarbons (PAHs), naphthalene, anthracene, phenanthrene, pyrene, chrysene, benzopyrene, benzoperylene, graphene or the like can be used.

Then, the raw material for graphitized hollow carbon is baked at a temperature ranging from 2000° C. to 3000° C., inclusive, in the presence of an inert gas such as nitrogen ($N_2$) so that graphitized hollow carbon is formed. The carbon five-membered rings are arranged at nearly equal intervals in the graphite constituting the graphitized hollow carbon.

Subsequently, the resulting graphitized hollow carbon is baked at a temperature ranging from 500° C. to 650° C., inclusive, in the presence of oxygen ($O_2$) so that the carbon five-membered rings in the graphitized hollow carbon are disappeared by being pyrolyzed. Thus, graphite particles 110 each having through-holes 112 and recesses 114 constituted by edges 110b of graphite are obtained. In the graphite, through-hole 112 is formed when the carbon five-membered rings in all of the graphene disappear, and recess 114 is formed when the carbon five-membered rings in a part of the graphene disappear. In addition, carbon six-membered rings positioned around the carbon five-membered rings may be pyrolyzed to disappear associated with pyrolyzing of the carbon five-membered rings.

Then, using a tetrachloroplatinic(II) acid ($H_2PtCl_4$) solution or the like as a supply source of catalyst particles 120, catalyst particles 120 are bound to through-holes 112 and recesses 114 of graphite particle 110 by a liquid phase reduction method. Alternatively, using a platinum metal or the like as a supply source of catalyst particles 120, catalyst particles 120 may be bound to through-holes 112 and recesses 114 of graphite particle 110 by a gas phase method such as sputtering. Through the processes described above, electrode catalyst material 100 can be obtained.

By applying resulting electrode catalyst material 100 onto the main surface of electrolyte membrane 12, anode catalyst layer 14 and cathode catalyst layer 16 are formed. By the above procedures, membrane electrode assembly 10 is obtained. Anode gas diffusion layer 20 and cathode gas diffusion layer 40 are stacked on resulting membrane electrode assembly 10, and further separators 2, 4 are stacked thereon, so that fuel cell 1 can be prepared.

The mixing ratio of the raw material capable of producing the carbon five-membered ring and the raw material capable of producing the carbon six-membered ring can be set based on an amount of catalyst particles 120 to be required. That is, numbers of through-hole 112 and recesses 114 to be formed on graphite particle 110 are determined from a target content of catalyst particles 120 in electrode catalyst material 100. A total number of through-holes 112 and recesses 114 is theoretically equal to a number of the carbon five-membered rings. Therefore, the ratio of the raw material capable of producing the carbon five-membered ring to the raw material capable of producing the carbon six-membered ring can be determined from the numbers of through-holes 112 and recesses 114 to be required.

As described above, electrode catalyst material 100 of the present exemplary embodiment includes graphite particles 110 and catalyst particles 120. Each of graphite particles 110 has a hollow structure that includes an outer shell, and the outer shell has through-holes 112 and recesses 114. Each of catalyst particles 120 is supported by through-hole 112 and recess 114. A part of at least one of through-hole 112 and recess 114 is constituted by edges 110b of graphite constituting graphite particle 110. It is possible to facilitate binding catalyst particle 120 to through-hole 112 and recess 114 by forming the part of at least one of through-hole 112 and recess 114 from edges 110b of graphite constituting graphite particle 110. Further, it is possible to uniformly arrange catalyst particles 120 on graphite particle 110 by binding catalyst particle 120 to through-hole 112 and recess 114. Further, since catalyst particles 120 can be stably held, the aggregation of catalyst particles 120 can be suppressed. As a result, power generation performance of fuel cell 1 can be improved, and lowering of power generation performance over time can be suppressed. Further, formation of through-holes 112 and recesses 114 also enables to increase a surface area of graphite particle 110.

Fuel cell 1 according to the present exemplary embodiment includes electrolyte membrane 12, anode catalyst layer 14, and cathode catalyst layer 16, and at least one of anode catalyst layer 14 and cathode catalyst layer 16 includes electrode catalyst material 100. In electrode catalyst material 100, catalyst particles 120 are uniformly dispersed in an initial state as described above, and a dispersion state of catalyst particles 120 can be maintained for a long time. Therefore, it is possible to improve power generation performance of fuel cell 1.

EXAMPLES

Hereinafter, examples according to the present exemplary embodiment will be described; however, these examples are merely exemplifications for suitably explaining the present disclosure, and do not limit the present disclosure.

Example 1

First, a membrane electrode assembly including an electrolyte membrane, an anode catalyst layer and a cathode catalyst layer was formed. The electrolyte membrane used was a polymer electrolyte membrane formed of a perfluorocarbon sulfonic acid polymer having hydrogen ion conductivity. Further, the anode catalyst layer and the cathode catalyst layer were formed by the following procedures. First, prepared was a PAN-based material obtained by insolubilizing PAN (manufactured by Mitsubishi Rayon Co., Ltd.) with heat treatment at 350° C. as a raw material capable of producing relatively many carbon five-membered rings after a baking process. Further, pyrene (manufactured by Tokyo Chemical Industry Co., Ltd.) was prepared as a raw material of a carbon six-membered ring. These raw materials were mixed to obtain a raw material for graphitized hollow carbon.

The raw material for graphitized hollow carbon was baked at a temperature of 2500° C. in the presence of a nitrogen gas so as to form graphitized hollow carbon. The graphitized hollow carbon has high oxidation resistance.

Next, the graphitized hollow carbon was subjected to a heat treatment by being exposed to an air atmosphere at 625° C. so as to form through-holes or recesses. Subsequently, platinum particles (catalyst) having an average particle diameter larger than the minimum diameter of the through-holes or the recesses were bound to the through-holes by sputtering. Through the processes described above, an electrode catalyst material was obtained. Then, the electrode catalyst material was applied onto a main surface of the electrolyte membrane, and the anode catalyst layer and the cathode catalyst layer were formed.

Then, an anode gas diffusion layer was stacked on the anode catalyst layer, and a cathode gas diffusion layer was stacked on the cathode catalyst layer. Gas diffusion layers each formed of carbon paper were used as the anode gas diffusion layer and the cathode gas diffusion layer. Then, a pair of separators were stacked so as to sandwich a laminated body composed of the anode gas diffusion layer, the membrane electrode assembly, and the cathode gas diffusion layer. As each of the pair of separators, a carbon mold separator was used. Through the processes described above, a fuel battery cell of Example 1 was obtained.

Comparative Example 1

A fuel battery cell of Comparative Example 1 was formed in the same manner as in Example 1 except that the anode catalyst layer and the cathode catalyst layer were formed using an electrode catalyst material formed by supporting platinum on Ketjen Black as porous carbon, and that a normal liquid phase reduction method was used for supporting platinum on Ketjen Black.
(Evaluation of Performance)

Power generation performance in each of the fuel battery cells of Example 1 and Comparative Example 1 was evaluated. Specifically, a fuel gas was supplied to an anode so as to be 70% in a utilization factor. The fuel gas had a dew point of about 55° C. Further, an oxidant gas was supplied to a cathode so as to be 50% in a utilization factor. The oxidant gas had a dew point of 65° C. Then, a load controller was controlled so that a constant current flowed, and a current density to electrode areas of the anode and the cathode was set to 2.0 A/cm$^2$. A voltage (initial voltage) of each of the fuel battery cells in this state was measured. Thereafter, a duration test of 200 hours was carried out, and a voltage (voltage after duration test) after the duration test was measured.

The fuel battery cell of Example 1 had an initial voltage of 650 mV, and the voltage after the duration test was 643 mV. On the other hand, the fuel battery cell of Comparative Example 1 had an initial voltage of 648 mV, and the voltage after the duration test was 321 mV. Comparing Example 1 with Comparative Example 1, in Comparative Example 1, the battery voltage after the duration test was reduced to one-half of the battery voltage before the duration test. On the other hand, in Example 1, a change in battery voltage was hardly found between before and after the duration test. From the results described above, it was verified that power generation performance of the fuel battery cell of Example 1 is improved as compared with that of Comparative Example 1.

Second Exemplary Embodiment

Hereinafter, a fuel cell according to a second exemplary embodiment will be described in detail. The second exemplary embodiment is different from the first exemplary embodiment in that an electrode catalyst material used in anode catalyst layer 14 or cathode catalyst layer 16 is different. Other configurations are similar to those of the first exemplary embodiment, and therefore descriptions of the configurations will be omitted.

Figure 3:
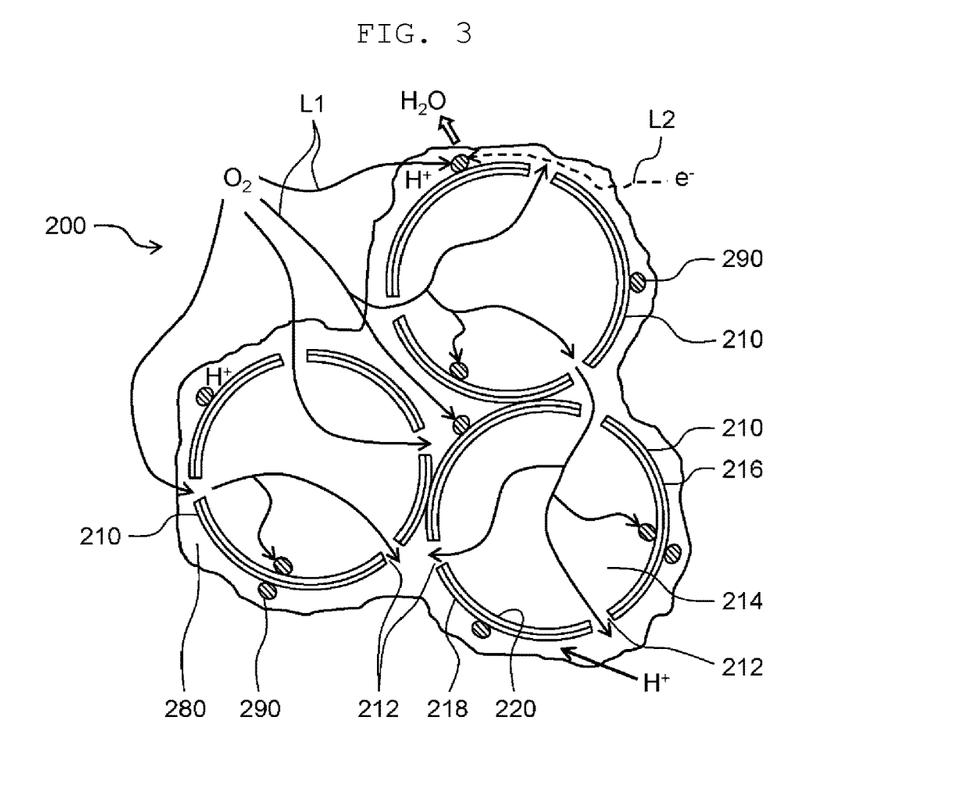
FIG. 3 is an enlarged schematic view illustrating a part of a cathode catalyst layer of a fuel cell according to a second exemplary embodiment.
Figure 4:
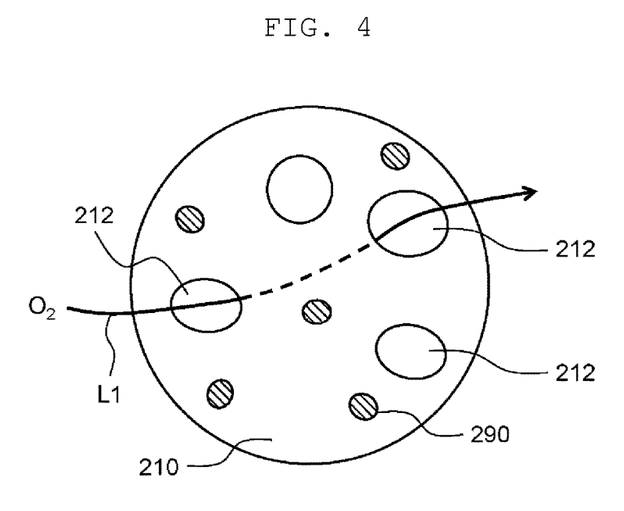
FIG. 4 is a schematic front view of a graphite particle.
Figure 5:
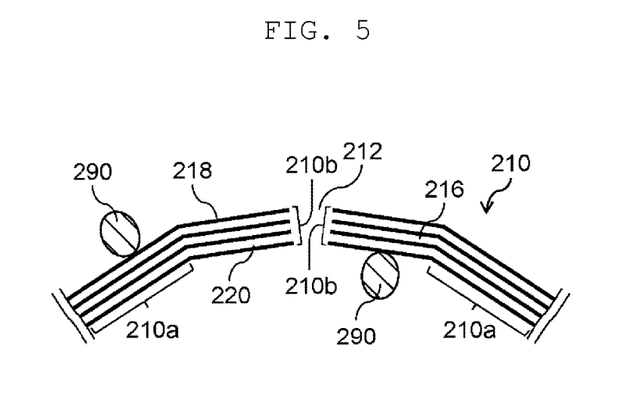
FIG. 5 is an enlarged schematic view near a through-hole of a graphite particle.

Next, the electrode catalyst material contained in anode catalyst layer 14 and cathode catalyst layer 16 in the second exemplary embodiment will be described in detail. Here, the electrode catalyst material contained in cathode catalyst layer 16 will be described as an example. The electrode catalyst material contained in anode catalyst layer 14 has the same constitution as that contained in cathode catalyst layer 16. FIG. 3 is an enlarged schematic view illustrating a part of cathode catalyst layer 16 of the fuel cell according to a second exemplary embodiment. FIG. 4 is a schematic front view of graphite particle 210. FIG. 5 is an enlarged schematic view near through-hole 212 of graphite particle 210.

As shown in FIG. 3, electrode catalyst material 200 includes graphite particles 210 and catalyst particles 290. In the present exemplary embodiment, electrode catalyst material 200 further includes ion exchange resin 280. Graphite is one example of the carbon member and graphite particles 210 are one example of primary particles of the carbon member.

Each of graphite particles 210 serves as a catalyst carrier having a conductive property. Each of graphite particles 210 has outer shell 216 surrounding hollow portion 214, and has through-holes 212 at outer shell 216. Each of through-holes 212 extends from outer surface 218 to inner surface 220 of graphite particle 210.

As shown in FIG. 5, outer shell 216 of graphite particle 210 has a stacked structure (graphite) in which a plurality of layers (graphene) composed of carbon six-membered rings lining up are stacked. The stacked structure of graphite particle 210 is maintained by a π-π interaction between the carbon six-membered rings of neighboring layers (graphene). Further, flat basal surfaces 210a are connected to each other with bending parts interposed between basal surfaces 210a, so that graphite particle 210 has a spherical shape.

Through-holes 212 are arranged at graphite of graphite particle 210. Through-holes 212 have an average opening size of, for example, 0.5 nm to 20 nm, inclusive. The opening size of through-hole 212 is a diameter of through-hole 212 at outer surface 218 of graphite particle 210. The average opening size of through-holes 212 is determined by randomly selecting several tens of circle equivalent diameters obtained from TEM image of a scanning transmission electron microscope (STEM) JEM-2800 (manufactured by JEOL Ltd.), measuring the diameters, and calculating an average value of the measured diameters.

When the average opening size of through-holes 212 is smaller than 0.5 nm, each of through-holes 212 is too small as a gas diffusion path, and therefore gas diffusibility is deteriorated. When the average opening size of through-holes 212 is larger than 20 nm, it is difficult to maintain the hollow structure of graphite particle 210.

Through-holes 212 are approximately uniformly (at equal intervals) arranged on outer shell 216 of graphite particle 210. As shown in FIG. 3, a plurality of through-holes 212 are formed in graphite particle 210, and at least two of through-holes 212 are opened at both ends of outer surface 218 and inner surface 220 without being blocked by catalyst particles 290. That is, in graphite particle 210, hollow portion 214 is communicated with an outside of graphite particle 210 through at least two through-holes 212.

Accordingly, as indicated by an arrow L1 in FIG. 3 and FIG. 4, an oxidant gas $O_2$ can flow into hollow portion 214 through through-hole 212 and can flow out of graphite particle 210 through another through-hole 212. In comparison with conventional electrode catalyst materials, electrode catalyst material 200 is provided with a path of through-hole 212-hollow portion 214-through-hole 212 as a gas diffusion path besides clearances formed between graphite particles 210, so that gas diffusibility is improved.

A maximum output density in a high current density region is increased by improvement of gas diffusibility. Further, it becomes possible to reduce a catalyst content in electrode catalyst material 200 since the utilization factor of catalyst particles 290 of platinum or the like is increased.

Catalyst particles 290 are, for example, particles pf platinum (Pt) that is a catalyst metal. Catalyst particles 290 have an average particle diameter of, for example, 1 nm to 8 nm, inclusive. The average particle diameter of catalyst particles 290 is defined as follows. That is, the average particle diameter of catalyst particles 290 is determined by randomly selecting several tens of circle equivalent diameters obtained from TEM image of a scanning transmission electron microscope (STEM) JEM-2800 (manufactured by JEOL Ltd.), measuring the diameters, and calculating an average value of the measured diameters.

A catalyst supporting ratio [catalyst particle weight/(graphite particle weight+catalyst particle weight)] that is a proportion of a weight of catalyst particles 290 to a sum of a weight of one of graphite particles (primary particles) 210 and the weight of catalyst particles 290 ranges from 10 wt % to 60 wt %, inclusive. When the catalyst supporting ratio of catalyst particles 290 is 10 wt % or more, it is possible to prevent a thickness of the catalyst layer from being too large in a case where the electrode catalyst material is applied in an amount required for power generation onto the main surface of electrolyte membrane 12. Therefore, a transfer distance of the supply gas (oxidant gas) within cathode catalyst layer 16 can be reduced, and power generation efficiency of a fuel cell is improved.

In addition, the catalyst supporting ratio can be determined by STEM-EDS measurement of a scanning transmission electron microscope (STEM) JEM-2800 (manufactured by JEOL Ltd.).

When a distance between catalyst particles 290 is too small, current concentration takes place to deteriorate power generation efficiency. When the catalyst supporting ratio of catalyst particles 290 is set to 60 wt % or less, the distance between catalyst particles 290 does not become too small. And thus, a reduction of power generation efficiency in a fuel cell can be avoided because a supply limitation of an amount of gas to be required for power generation is inhibited.

Ion exchange resin 280 (ionomer) plays a role of transferring a proton I-IF between catalyst particle 290 and electrolyte membrane 12. As ion exchange resin 280, a polymer material similar to electrolyte membrane 12 may be used.

In cathode catalyst layer 16, as shown by a dashed line L2 in FIG. 3, an electron (e⁻) having transferred from cathode gas diffusion layer 40 moves, through graphite particle 210, to a reaction point at which catalyst particle 290 positions. Also, a proton (H⁺) having transferred from electrolyte membrane 12 moves to the reaction point through ion exchange resin 280. Also, oxygen ($O_2$) supplied from cathode gas diffusion layer 40 to cathode catalyst layer 16 moves to the reaction point. Then, the reaction represented by Formula (2) above takes place at the reaction point by an action of catalyst particle 290 to generate water ($H_2O$).

Figure 6:
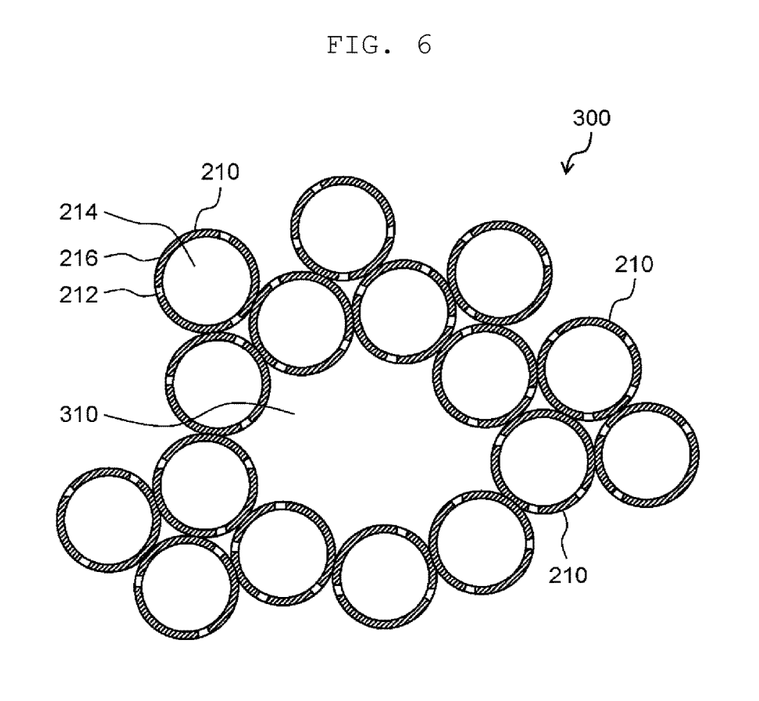
FIG. 6 is an enlarged schematic view illustrating a part of a cathode catalyst layer.

FIG. 6 is a schematic view showing secondary particle 300 of graphite formed in electrode catalyst material 100 constituting cathode catalyst layer 16. Secondary particle 300 of graphite is formed by aggregation of a plurality of graphite particles 210 (primary particles). In FIG. 6, catalyst particles 290 and ion exchange resin 280 are omitted in order to facilitate viewing the aspect of the secondary particle.

Clearance 310 is formed between the plurality of primary particles 210 constituting secondary particle 300 of graphite. An average clearance value between primary particles 210 in secondary particle 300 is larger than the average opening size in primary particles 210. An average clearance value in the secondary particle is, for example, from 10 nm to 200 nm, inclusive. Through-holes 212 of primary particles 210 have an average opening size of 0.5 nm to 20 nm, inclusive. Since the average clearance value in secondary particle 300 is larger than the average opening size of through-holes 212 of primary particles 210, it is possible to predominantly pass not only supply gases such as a fuel gas and an oxidant gas but also generated water through clearance 310 of secondary particle 300 having a large average clearance value. Accordingly, through-holes 212 of the primary particle play a role of a branch path that spreads the supply gas through the entire catalyst layer. Further, since the opening size of through-hole 212 of primary particle 210 is small and a surface of graphite particle 210 has hydrophobicity, generated water hardly passes through through-hole 212 of graphite particle 210. Therefore, through-hole 212 can be utilized as a path through which the supply gas preferentially passes. Thus, in order to provide power generation with efficiency through the entire catalyst layer, it is important to quickly spread the supply gas through the entire catalyst layer.

The average clearance value between primary particles 110 in secondary particle 300 can be determined by measurement of a fine pore distribution by a mercury porosimeter. More specifically, AutoPore IV 9500 (manufactured by Shimadzu Corporation) is used, and measurement is performed under a condition of a pressure range of 3.45 kPa (corresponding to 360 μm) to 414 MPa (corresponding to 0.003 μm). The average clearance value in secondary particle 300 can be measured using the mercury porosimeter.

Electrode catalyst material 200 can be manufactured, for example, by the following manufacturing method including a hollow-structure preparing step, a catalyst supporting step, and a through-hole forming step.

(Hollow-Structure Preparing Step)

First, two kinds of raw material are mixed in a predetermined ratio to obtain a raw material for graphitized hollow carbon. One is a raw material capable of producing relatively many carbon five-membered rings after a baking treatment described later. The other is a raw material hardly producing carbon five-membered rings after the baking treatment described later, for example, a raw material capable of producing a carbon six-membered ring. As the raw material capable of producing relatively many carbon five-membered rings, for example, polyacrylonitrile (PAN)-based raw materials subjected to an insoluble treatment, petroleum-based pitches, coal-based pitches, mesophase-based pitches or the like can be used. As the raw material capable of producing a carbon six-membered ring, for example, polycyclic aromatic hydrocarbons (PAHs), naphthalene, anthracene, phenanthrene, pyrene, chrysene, benzopyrene, benzoperylene, graphene or the like can be used.

Then, the raw material for graphitized hollow carbon is baked at a temperature ranging from 2000° C. to 3000° C., inclusive, in the presence of an inert gas such as nitrogen ($N_2$) so that graphitized hollow carbon is formed. The carbon five-membered rings are arranged at nearly equal intervals in the graphite constituting the graphitized hollow carbon.

(Catalyst Supporting Step)

Subsequently, catalyst particles 290 are bound to an outer surface of an outer shell of the graphitized hollow carbon by a liquid phase reduction method using chloroplatinic acid as a platinum (Pt) source. In addition, using a platinum metal or the like as a supply source of catalyst particles 290, catalyst particles 290 may be bound to the outer surface of the outer shell of the graphitized hollow carbon by a gas phase method such as sputtering. In this manner, catalyst particles 290 are supported on the outer surface of the outer shell.

(Through-Hole Forming Step)

Then, the graphitized hollow carbon on which catalyst particles 290 are supported is baked at a temperature ranging from 500° C. to 650° C., inclusive, in the presence of oxygen ($O_2$) so that the carbon five-membered rings in the graphitized hollow carbon are disappeared by being pyrolyzed. Thus, graphite particles 210 each having through-holes 212 at outer shell 216 are obtained. In outer shell 216, through-holes 112 are formed when the carbon five-membered rings in all of the graphene disappear. In addition, carbon six-membered rings positioned around the carbon five-membered rings may be pyrolyzed to disappear associated with pyrolyzing of the carbon five-membered rings.

Many of catalyst particles 290 supported near the carbon five-membered rings of graphene of outer shell 216 before baking get away from outer surface 218 by the disappearance of the carbon five-membered rings due to baking. On the other hand, many of catalyst particles 290 supported on a position apart from the carbon five-membered rings of graphene of outer shell 216 before baking remain to be supported on outer surface 218 regardless of disappearance of the carbon five-membered rings due to baking. That is, catalyst particles 290 are supported on graphite particle 210 at the surface of outer shell 216 excluding through-hole 212.

Through the processes described above, electrode catalyst material 200 can be obtained.

By applying resulting electrode catalyst material 200 onto the main surface of electrolyte membrane 12, anode catalyst layer 14 and cathode catalyst layer 16 are formed. By the above procedures, membrane electrode assembly 10 is obtained. Anode gas diffusion layer 20 and cathode gas diffusion layer 40 are stacked on resulting membrane electrode assembly 10, and further separators 2, 4 are stacked thereon, so that fuel cell can be prepared.

The mixing ratio of the raw material capable of producing the carbon five-membered ring and the raw material capable of producing the carbon six-membered ring can be set based on a number of through-holes 212 to be required. A total number of through-holes 212 is theoretically equal to a number of the carbon five-membered rings. Therefore, the ratio of the raw material capable of producing the carbon five-membered ring to the raw material capable of producing the carbon six-membered ring can be determined from the number of through-holes 212 to be required.

In addition, an order of the catalyst supporting step and the through-hole forming step may be changed. In this case, through-holes 212 are formed by the through-hole forming step, and catalyst particles 290 are supported on outer surface 218 of outer shell 216 by the catalyst supporting step. In the catalyst supporting step, since through-holes 212 have already been formed, catalyst particles 290 are supported on not only outer surface 218 but also inner surface 220. In this case, the average particle diameter of catalyst particles 290 supported on inner surface 220 is preferably set to a value smaller than the average opening size of through-holes 212. Thus, blocking of through-holes 212 can be suppressed even if catalyst particles 290 are supported near through-holes 212. In addition, when the liquid phase reduction method is used in the catalyst-supporting step, the chloroplatinic acid solution that is a supply source of catalyst particles 290, or the like enter into the inside of graphite particle 210, and therefore catalyst particles 290 are easily supported on inner surface 220 as compared with the gas phase method such as sputtering.

In cathode catalyst layer 16, an electron ($e^-$) having transferred from cathode gas diffusion layer 40 moves to a reaction point within the hollow portion at which catalyst particle 290 supported on inner surface 220 positions. A proton ($H^+$) having transferred from electrolyte membrane 12 moves to the reaction point within the hollow portion through ion exchange resin 280. Also, oxygen ($O_2$) supplied from cathode gas diffusion layer 40 to cathode catalyst layer 16 moves to the reaction point within the hollow portion. Then, the reaction represented by Formula (2) above takes place at the reaction point within a hollow portion by an action of catalyst particle 290 to generate water ($H_2O$).

As shown in FIG. 3, since the reaction represented by Formula (2) takes place by the oxidant gas 02 having flown into hollow portion 214 of graphite particle 210 and catalyst particles 290 supported on inner surface 220, power generation performance of the fuel cell can be improved. However, a number of catalyst particles 290 supported on outer surface 218 of outer shell 216 of graphite particle (primary particle) 210 is preferably larger than a number of catalyst particles 290 supported on inner surface 220. Since more catalyst particles 290 are supported on outer surface 218, a catalytic reaction of the supply gas is easily taken place. Further, since catalyst particles 290 can also be supported on inner surface 220, a location on which catalyst particle 290 can be supported is increased, and therefore the distance between catalyst particles 290 can be increased. Therefore, current concentration can be avoided, and a reduction in power generation efficiency can be suppressed.

As described above, electrode catalyst material 200 includes graphite particles 210, namely, the primary particles of the carbon member and catalyst particles 290. Each of the primary particles of the carbon member has outer shell 216 surrounding hollow portion 214, and has through-holes 212 at outer shell 216. That is, each of the primary particles of the carbon member has a hollow structure that includes outer shell 216, and outer shell 216 has through-holes 212. Catalyst particles 290 are supported on a surface of the outer shell. At least two of through-holes 212 are opened without being blocked by catalyst particles 290. This enables the gas diffusion path in anode catalyst layer 14 or cathode catalyst layer 16 to increase, resulting in an improvement in the gas diffusibility. Accordingly, a distribution of a gas concentration and local power generation within the catalyst layer can be avoided to improve power generation performance of the fuel cell.

The fuel cell according to the present exemplary embodiment includes electrolyte membrane 12, anode catalyst layer 14, and cathode catalyst layer 16, and anode catalyst layer 14 and cathode catalyst layer 16 each include electrode catalyst material 200. Thus, the fuel cell can exert favorable effect that has been described in the section of electrode catalyst material 200.

The scope of the present disclosure is not limited to the exemplary embodiments described above, and includes modifications and variations since those skilled in the art can add various design changes to the exemplary embodiments.

In the first exemplary embodiment described above, each of graphite particles 110 has both of through-holes 112 and recesses 114. However, graphite particle 110 is not particularly limited to this configuration, and graphite particle 110 may include at least one of through-hole 112 and recess 114. Further, catalyst particles 120 may be supported on graphite particle 110 at least one of through-hole 112 and recess 114.

In the first exemplary embodiment described above, electrode catalyst material 100 may contain bulky carbon members such as multi-walled carbon nanotube (MWCNT), fullerene soot, porous carbon, and activated carbon. This can enhance gas diffusibility, drainage property and electron conductivity in the catalyst layer including electrode catalyst material 100.

In the second exemplary embodiment described above, electrode catalyst material 200 may contain bulky carbon members such as multi-walled carbon nanotube (MWCNT), fullerene soot, porous carbon, and activated carbon, in place of graphite as the primary particles of the carbon member. Further, electrode catalyst material 200 may contain bulky carbon members such as multi-walled carbon nanotube (MWCNT), fullerene soot, porous carbon, and activated carbon together with graphite as the primary particles of the carbon member. That is, the primary particles of the carbon member may be those each having a hollow structure, and such particles can enhance gas diffusibility, drainage property and electron conductivity in the catalyst layer including electrode catalyst material 200 even if the particles are granular particles such as spherical particles, flatted spherical particles and ellipsoidal particles, or rod-like particles. In addition, in the case of rod-like particles, it is desired that one or more through-holes are present besides through-holes at both ends in a longitudinal direction. The reason for this is that a transfer path for gas passing through the hollow portion of a rod-like carbon member becomes short. However, the granular primary particles are more preferred than the rod-like primary particles since a transfer path for gas passing through the hollow portion of the granular primary particle is shorter than that of the rod-like particle. Further, there is an advantage that the granular primary particles are more preferred than the rod-like primary particles in that control of the average clearance value between the primary particles is easy.

In the first and second exemplary embodiments described above, electrode catalyst materials 100, 200 may contain a carbon member having water repellency such as carbon fluoride. Alternatively, water repellency may be imparted to graphite particles 110, 210. This can enhance the drainage property in the catalyst layer including electrode catalyst materials 100, 200.

In the first and second exemplary embodiments described above, the fuel cell is a polymer electrolyte fuel cell. However, the fuel cell is not particularly limited to this configuration, and the fuel cell may be another type fuel cell such as an alkaline fuel cell (AFC).

In the first and second exemplary embodiments described above, anode catalyst layer 14 and cathode catalyst layer 16 contain electrode catalyst material 100 or electrode catalyst material 200 according to these exemplary embodiments. However, the embodiments are not particularly limited to this configuration, and only one of anode catalyst layer 14 and cathode catalyst layer 16 may contain electrode catalyst material 100 or electrode catalyst material 200.

A fuel cell of the present disclosure has high power generation performance, and can be put to a wide variety of uses such as power sources for domestic use, in-vehicle power sources and power sources for mobile devices.

What is claimed is:

1. An electrode catalyst material comprising:
graphite particles each having a hollow structure that includes an outer shell constituted by a graphite, the outer shell having at least one of a through-hole and a recess, the through-hole penetrating from an outer surface of the graphite to an inner surface of the graphite, the recess being a closed-end hole which extends from the outer surface of the graphite to a midpoint in the graphite; and
catalyst particles each supported by the at least one of the through-hole and the recess, wherein:
a part of the at least one of the through-hole and the recess is constituted by an edge of the graphite constituting each of the graphite particles, and
a minimum diameter of the at least one of the through-hole and the recess is smaller than an average particle diameter of the catalyst particles.

2. The electrode catalyst material according to claim 1, wherein a thickness of the outer shell ranges from 1 nm to 50 nm, inclusive.

3. The electrode catalyst material according to claim 1, wherein fluorine exists in the edge of the graphite.

4. An electrode catalyst material comprising:
primary particles made of a carbon member each having a hollow structure that includes an outer shell constituted by a graphite, the outer shell having through-holes penetrating from an outer surface of the graphite to an inner surface of the graphite;
a secondary particle formed by aggregation of the primary particles; and
catalyst particles each supported on a surface of the outer shell, wherein:
at least two of the through-holes are opened without being blocked by at least one of the catalyst particles, and
an average clearance value between the primary particles in the secondary particle is larger than an average opening size of the through-holes.

5. The electrode catalyst material according to claim 4, wherein an average opening size of the through-holes ranges from 0.5 nm to 20 nm, inclusive.

6. The electrode catalyst material according to claim 4, wherein a catalyst supporting ratio that is a proportion of a weight of the catalyst particles in a sum of a weight of one of the primary particles and the weight of the catalyst particles ranges from 10 wt % to 60 wt %, inclusive.

7. A fuel cell comprising:
an electrolyte membrane;
an anode catalyst layer disposed on one surface of the electrolyte membrane; and
a cathode catalyst layer disposed on a surface of the electrolyte membrane opposite to the one surface of the electrolyte membrane,
wherein at least one of the anode catalyst layer and the cathode catalyst layer includes the electrode catalyst material according to claim 1.

8. A fuel cell comprising:
an electrolyte membrane;
an anode catalyst layer arranged on one surface of the electrolyte membrane; and
a cathode catalyst layer arranged on a surface of the electrolyte membrane opposite to the one surface of the electrolyte membrane, wherein at least one of the anode catalyst layer and the cathode catalyst layer includes the electrode catalyst material according to claim 4.

9. An electrode catalyst material comprising:
graphite particles each having a hollow structure that includes an outer shell having a substantially spherical shape, the outer shell having at least one of a through-hole and a recess; and
catalyst particles each supported by the at least one of the through-hole and the recess,
wherein a part of the at least one of the through-hole and the recess is constituted by an edge of graphite constituting each of the graphite particles.

10. The electrode catalyst material according to claim 9, wherein a minimum diameter of the at least one of the through-hole and the recess is smaller than an average particle diameter of the catalyst particles.

11. The electrode catalyst material according to claim 9, wherein a thickness of the outer shell ranges from 1 nm to 50 nm, inclusive.

12. The electrode catalyst material according to claim 9, wherein fluorine exists in the edge of the graphite.

13. A fuel cell comprising:
an electrolyte membrane;
an anode catalyst layer disposed on one surface of the electrolyte membrane; and
a cathode catalyst layer disposed on a surface of the electrolyte membrane opposite to the one surface of the electrolyte membrane,
wherein at least one of the anode catalyst layer and the cathode catalyst layer includes the electrode catalyst material according to claim 9.

* * * * *